United States Patent [19]
Huang

[11] Patent Number: 5,756,024
[45] Date of Patent: May 26, 1998

[54] METHOD OF MANUFACTURING A BIODEGRADABLE CONTAINER

[76] Inventor: Fu Ming Huang, 17F, No. 958, Sec. 2, Chung Shan Rd, Changhua, Taiwan

[21] Appl. No.: 696,796

[22] Filed: Aug. 14, 1996

[30] Foreign Application Priority Data

May 27, 1996 [TW] Taiwan .................... 85106290

[51] Int. Cl.⁶ ............................................. B29C 43/14
[52] U.S. Cl. .................... 264/113; 264/119; 264/120; 264/124; 264/129; 264/294; 264/DIG. 69
[58] Field of Search ........................ 264/119, 113, 264/123, 109, 37, DIG. 69, 124, 129, 120, 294

[56] References Cited

U.S. PATENT DOCUMENTS

| | | | |
|---|---|---|---|
| 3,686,384 | 8/1972 | Runton | 264/122 |
| 3,842,537 | 10/1974 | Bishop | 47/37 |
| 3,850,677 | 11/1974 | Vasishth | 264/123 |
| 3,883,068 | 5/1975 | Silver | 229/31 R |
| 4,627,951 | 12/1986 | Shen | 264/109 |
| 5,017,319 | 5/1991 | Shen | 264/124 |
| 5,279,658 | 1/1994 | Aung | 106/154.1 |
| 5,300,333 | 4/1994 | Wilkerson et al. | 428/35.6 |
| 5,411,691 | 5/1995 | Hwang | 264/115 |

FOREIGN PATENT DOCUMENTS

| | | |
|---|---|---|
| 94100038.9 | 7/1995 | Switzerland . |
| 74103826 | 8/1974 | Taiwan . |
| 74103826 | 5/1976 | Taiwan . |

*Primary Examiner*—Jeffery R. Thurlow
*Attorney, Agent, or Firm*—Bacon & Thomas

[57] ABSTRACT

A method for manufacturing a container from husk includes the steps of comminuting the husk into powder form, mixing the powder with an edible adhesive, with the introduction of steam, to form a paste, forming a blank from the paste, shaping the blank into a primary semi-product, re-shaping the primary semi-product to force the paste to flow and fill into cracks formed on the primary semi-product during the shaping step to form a secondary semi-product, drying the secondary semi-product and applying a surface coating to the dried product and then drying the surface coating.

13 Claims, 3 Drawing Sheets

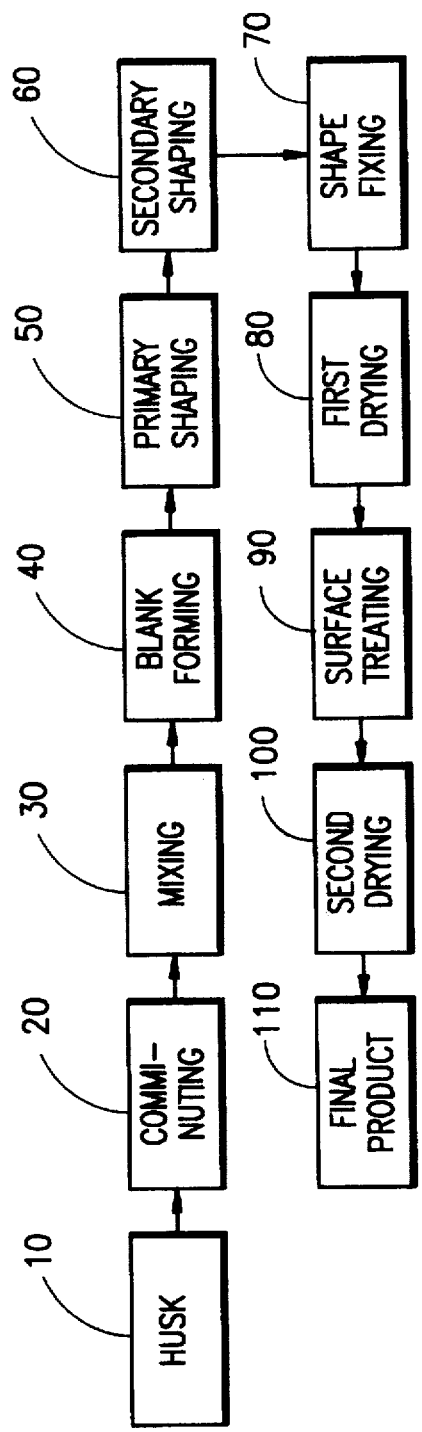
FIG. 1
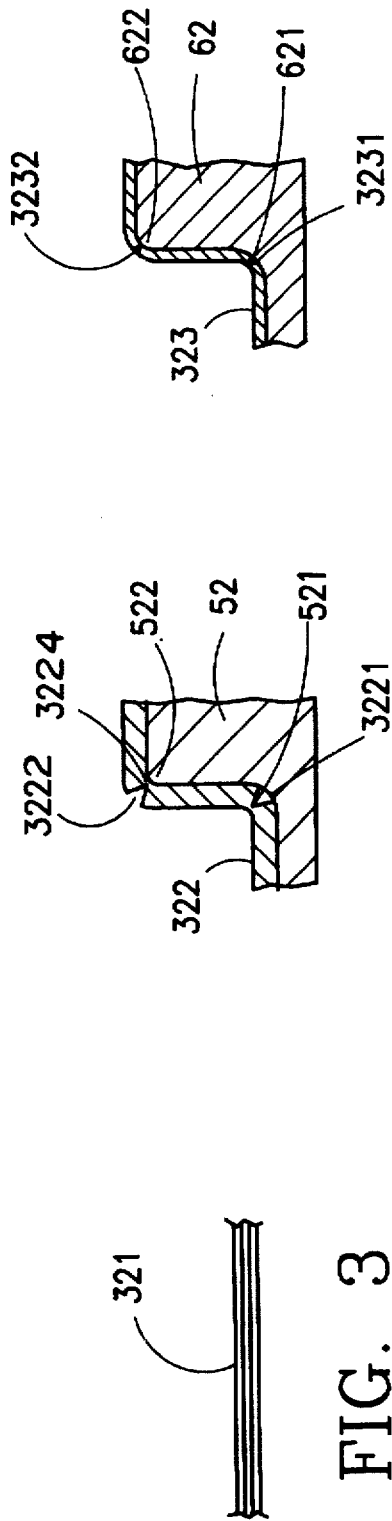
FIG. 5
FIG. 4
FIG. 3

METHOD OF MANUFACTURING A BIODEGRADABLE CONTAINER

FIELD OF THE INVENTION

The present invention relates to a method for manufacturing containers, especially food containers, from husks, such as rice husk, and also relates to a bio-degradable container made of husks.

BACKGROUND OF THE INVENTION

Containers, especially food containers, such as bowls and cups, have been widely used in human society. In a modern society, disposable food containers have been very prevailing for they do not need to be cleaned after use and do not transmit disease between individuals. The disposable food containers are usually made of paper material or synthetic materials, such as polypropylene and polystyrene foam. The drawbacks of paper container is that the manufacturing of the paper containers consumes a great quantity of pulp which is obtained by cutting down trees and thus causing a damage to the earth environment. As to the synthetic materials mentioned above, they are usually not suitable for making food containers for they release toxicant material when heated by cooked hot foods, such as hot soup or hot coffee. Furthermore, such synthetic materials, basically, are not bio-degradable. In other words, they will last almost forever after being discarded. This is even a more severe environmental problem, as compared to cutting trees.

To overcome the above problems, food containers made of edible and bio-degradable materials have been developed. For example, Taiwan patent publication Nos. 82423 and 99257 disclose food containers made of corn starches. A major drawback associated with corn starch containers is that it is quite in-economic to use the edible corn starch to make disposable container while there are people starved to death.

There is also food container made of bio-degradable material rather than corn starches developed recently, such as Chinese patent application No. 94100038.9, published on Jul. 12, 1995, which teaches to make use of husk as the raw material for manufacturing disposable containers. Such a container is both environment compatible and non-toxicant to human body. However, the technique of the above-referenced Chinese patent application has inherent drawbacks:

(1) Due to the fact that the husks contain very little fibrous material (approximately 0.3%), the containers made of husks suffer cracking in shaping process and it is very difficult to form an intact container.

(2) Food containers made of husk are not practical in containing high temperature liquid, for example a food container made of husk with a thickness of about 1 mm disintegrates within 4–5 minutes when it contains liquid of 60° C.

It is therefore desirable to provide a food container that is environment compatible and non-toxicant to human body to overcome the above-mentioned problems.

OBJECTS OF THE INVENTION

Therefore, the principal object of the present invention is to provide a container which is made of husk so as to make a complete utilization of the waste husk and which does not cause any damage to environment and human body.

Another object of the present invention is to provide a method for manufacturing containers from husk which overcomes the drawbacks of prior art resulting from lacking fibrous material in the husk.

A further object of the present invention is to provide a food container which does not contain toxicant material and is completely bio-degradable.

The present invention will be better understood from the following description of a preferred procedure for making the container in accordance with the present invention, with reference to the attached drawings, wherein:

BRIEF DESCRIPTION OF THE DRAWINGS

FIG. 1 is block diagram showing the process of making container in accordance with the present invention;

FIG. 3 is a schematic side elevational view showing a portion of a multiple-folded blank used to form the container in accordance with the present invention;

FIG. 4 is a cross-sectional view showing a portion of a container made in accordance with the present invention after the step of primary shaping;

FIG. 5 is a view similar to FIG. 4, showing the container after secondary shaping step.

DETAILED DESCRIPTION OF THE PREFERRED EMBODIMENT

Figure 2:
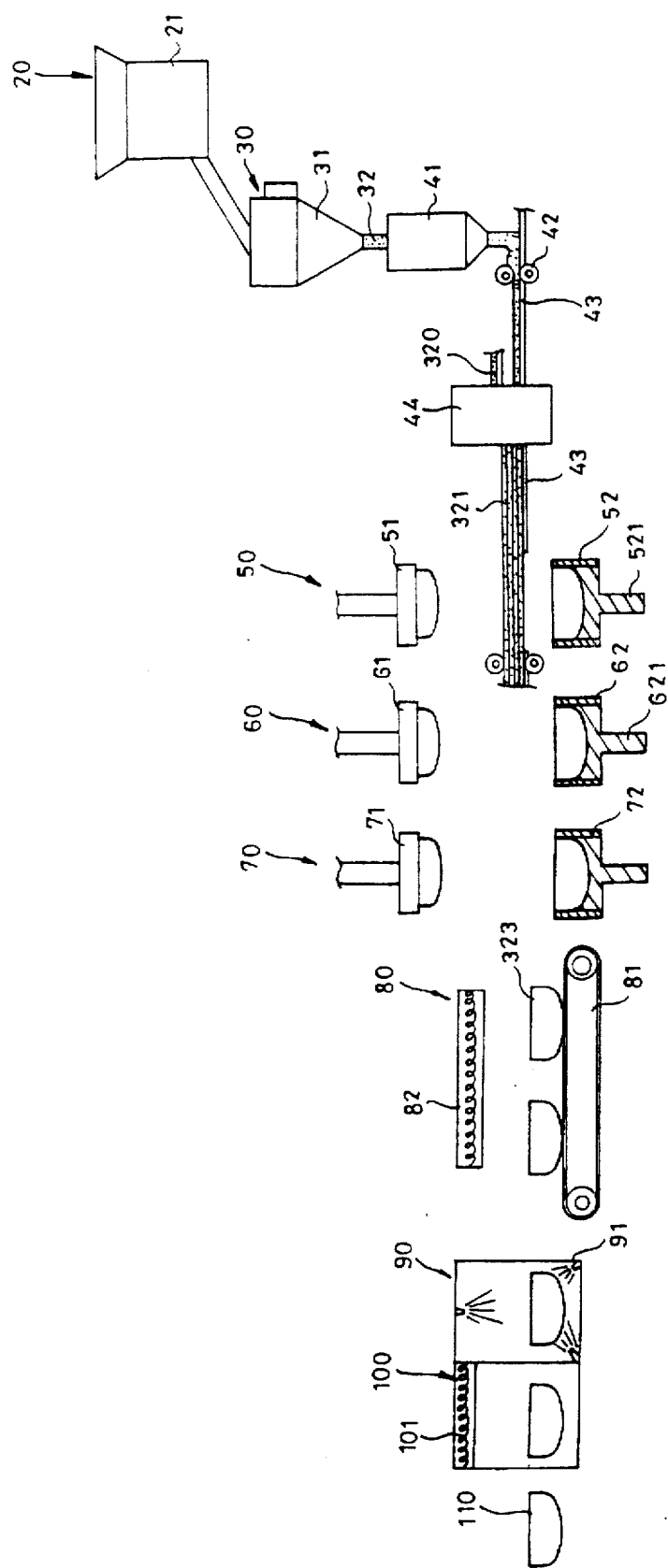
FIG. 2 is a schematic side elevational view showing the apparatus and process for making the container in accordance with the present invention.

With reference to the drawings and in particular to FIGS. 1 and 2, wherein a method for manufacturing container from husk in accordance with the present invention is shown, the method comprises the steps of comminuting 20, mixing 30, blank forming 40, primary shaping 50, secondary shaping 60, shape-fixing 70, first drying 80, surface treating 90 and second drying 100. These steps will now be further described.

In accordance with the present invention, the raw material used to manufacture the containers, which is indicated at 10 in FIG. 1, comprises husks, preferably rice husk, which is fed into a comminuting device 21 and comminuted to powder form. Such powders may have different sizes to meet the needs of different applications. This is the comminuting step 20.

The powder material is then supplied to a mixing device 31 to mix with a suitable amount of edible adhesive which may be any known edible, non-toxicant adhesive. In the mixture, the powder material takes 88–92% and the adhesive 12–8% in weight. Steam having a pressure of 7 lb/cm$^2$ is introduced into the mixing device 31 to mix with the mixture after the powder material and the adhesive are completely mixed. The mixture is stirred at a desired speed to completely mix with the steam and a paste-like material 32 is formed. This is the mixing step 30.

The paste 32 is then fed into a collection hopper 41 to be supplied to the blank-forming step 40. The blank-forming step 40 comprises using a conveyor, preferably a belt conveyor 43 to which the paste 32 is supplied from the hopper 41, to move the paste 32 through a pair of rollers 42 so as to have the paste 32 rolled into a sheet or thin plate like blank 320 having a predetermined thickness, preferably 0.7 mm. A folding device 44 is provided along the conveyor 43 to fold the blank 320 into a multiple-folded lamination 321, which preferably has four folds, see FIG. 3.

The conveyor 43 then moves the laminated blank 321 into the primary shaping step 50. The primary shaping step 50 comprises a male die member 51 and a mated female die member 52 which are movable relative to each other to performing pressing operation on the laminated blank 321 with a pressure of 150–180 Kg/cm² to form a primary semi-product 322.

Further referring to FIGS. 4 and 5, since the husk powder hardly contains any fibrous material, the primary semi-product 322 that is formed by the primary shaping step 50 often breaks at angled portions of the female die member 52, such as those indicated at 521 and 522, so that cracks 3222 and 32221, see FIG. 4, are formed on the primary semi-product 322 with only a portion of the thickness of the blank 321, such as those indicated at 3223 and 3224, remaining unbroken. It is thus desired to have the primary semi-product 322 undergo a secondary shaping operation 60 to eliminate the cracks.

The female die member 52 of the primary shaping step 50 comprises a release member 521 which releases and supports the primary semi-product 322 from the female die member 52. The primary semi-product 322 is then transferred by being supported by the release member 521 to the secondary shaping step 60 which comprises a male die member 61 and a mated female die member 62 to press the primary semi-product 322 by the die members 61 and 62 with an instantaneous heating to approximate 100° C. so as to form a completely shaped container product 323, which is also referred to as secondary semi-product having a shape completely the same as the desired final product.

In the secondary shaping (pressing) operation 60, the pressure applied to the primary semi-product 322 by the die members 61 and 62 forces the paste material of the primary semi-product 322 to flow and fill into the cracks 3221 and 3222 so as to form a smooth and continuous surface as indicated at 3231 and 3232 in FIG. 5.

The secondary semi-product 323 so formed may still be soft and possesses no desired rigidity. To solve such a problem, the secondary semi-product 323 is carried by a release member 621 associated with the female die member 62 of the secondary shaping operation 60 to the shape-fixing step 70 to undergo a shape-fixation operation which is done with a male die member 71 and a female die member 72 to apply pressure to the secondary semi-product 323 again with an instantaneous heating to approximately 100° C. This substantially increases the mechanical strength of the product.

The product 323, after being shape-fixed, is moved by a second conveyor 81 to undergo the first drying step 80 which is done by making use of heating device 82 to dry the product by means of heat radiation at approximately 60°–80° C. The so dried product is then moved into a surface treating device 91 to be coated with a non-toxicant, edible surface coating in the surface treatment step 90 to serve as a protective coating to the container. Thereafter, a second drying step 100 is taken to dry the surface coating of the product with a second heat drying device 101 at a temperature of approximately 180°–200° C. so as to obtain the final product 110.

It can be seen from the above description that the present invention fully makes use of waste material to manufacture container 110 by comminuting the waste material to powder form and mixing the powder with suitable adhesive to provide a paste. The paste then undergoes blank-forming and folding operation to provide a blank of multiple-folded lamination having a loose structure which allows the paste to fill into the cracks that are formed on the semi-product at the primary shaping operation when it is subject to a secondary shaping operation with instantaneous heating to approximately 100° C. This effectively eliminates the cracks that often occur in the prior art. Thereafter, a surface coating is applied to the semi-product which after being dried, allows the final product to endure high temperature liquid within quite a period (approximately 2–40 hours) without dissolution.

Figure 6:
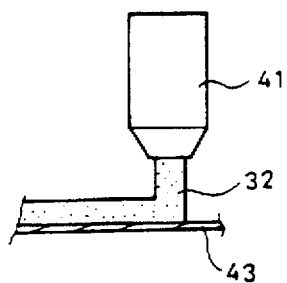
FIG. 6 is a schematic side elevational view showing a variation of forming the blank for making the container.

In FIG. 6, a variation of the present invention is shown wherein the rollers 42 are eliminated so that the paste 32, without being rolled, forms a thick blank, as compared to that is rolled by the rollers 42. Such a thick blank may be directly supplied to the primary shaping step 50 for manufacturing containers of larger sizes.

Thus, the present invention provides the following advantages:

(1) The present invention solves the problem in the prior art that containers made of husks are not capable to contain high temperature liquid for a long while.

(2) The present invention solves the problem in the prior art that containers made of husks cannot be suitably shaped as desired without any crack.

(3) The present invention provides a container that does not generate toxicant material in high temperature and can be disposed in a completely environmentally friendly manner.

(4) The present invention provides a container that is water dissoluble.

(5) The present invention provides a container which will completely decompose once a crack is formed and gets in contact with water.

Although the best model for carrying out the present invention has been described, it is apparent that changes and modifications in the best model can be carried out without departing from the scope of the invention which is intended to be limited only by the appended claims.

What is claimed is:

1. A method of manufacturing a container from husks comprising the steps of:
   a) comminuting the husks into powder form;
   b) mixing the husk powder with an adhesive in a pre-determined ratio to form a paste;
   c) forming a sheet from the paste;
   d) subjecting the sheet to a first shaping step by placing the sheet between first male and female die members and closing the first male and female die members to form a semi-shaped container product;
   e) transferring the semi-shaped container product to second male and female die members and subjecting the semi-shaped container product to a second shaping and fixation operation to form a container having a desired final shape;
   f) drying the final shaped container;
   g) applying a surface coating to the final shaped container to form a protective coating thereon; and,
   h) drying the surface coating.

2. The method as claimed in claim 1, wherein the adhesive used in the mixing step comprises an edible, non-toxic adhesive.

3. The method as claimed in claim 1, wherein the sheet forming step comprises the steps of forming a paste sheet having a pre-determined thickness and folding the paste sheet over on itself a plurality of times to form a laminated sheet.

4. The method as claimed in claim 3, wherein the thickness of the paste sheet is 0.7 mm.

5. The method as claimed in claim 1, wherein the step of applying a surface coating comprises using a coating of an edible, non-toxic and water dissoluble material.

6. The method as claimed in claim 1, wherein the mixing step comprises a further step of introducing steam of a predetermined pressure with the husk powder and adhesive.

7. The method as claimed in claim 6, wherein the predetermined steam pressure is 7 lb/cm$^2$.

8. The method as claimed in claim 1, wherein the ratio of the husk powder to the adhesive is between 88–12% and 92–8% by weight.

9. The method as claimed in claim 1, wherein the shape-fixation step is carried out with an instantaneous heating to approximately 100° C.

10. The method as claimed in claim 1, wherein the pressure exerted by the first male and female die members is between 150–180 Kg/cm$^2$.

11. The method as claimed in claim 1, wherein the step of drying the final shaped container is carried out at a temperature of 60–80° C.

12. The method as claimed in claim 1, wherein the step of drying the surface coating is carried out at a temperature of 180°–200° C.

13. The method of manufacturing a container as claimed in claim 1 wherein subjecting the semi-shaped container product to a second shaping and fixation operation comprises the steps of:

a) shaping the semi-shaped container product to a final shape;

b) transferring the final shape container to third male and female die members; and, c) applying a predetermined pressure while heating the final shape container to increase the mechanical strength of the container.

* * * * *